US006746332B1

(12) United States Patent  
Ing et al.

(10) Patent No.: US 6,746,332 B1
(45) Date of Patent: Jun. 8, 2004

(54) VISUAL DISPLAY SYSTEM FOR MULTI-USER APPLICATION

(75) Inventors: Graeme R. Ing, San Diego, CA (US); David Bryant Taylor, San Diego, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 0 days.

(21) Appl. No.: 09/811,037

(22) Filed: Mar. 16, 2001

Related U.S. Application Data

(60) Provisional application No. 60/189,845, filed on Mar. 16, 2000.

(51) Int. Cl.[7] .................................................. A63F 13/00
(52) U.S. Cl. ........................................... 463/42; 463/1
(58) Field of Search ............................ 463/1, 29, 40–43; 345/733, 734, 736, 738; 702/182, 187, 188; 709/224, 204; 370/396

(56) References Cited

U.S. PATENT DOCUMENTS

| | | | | |
|---|---|---|---|---|
| 4,572,509 | A | * | 2/1986 | Sitrick ........................ 463/31 |
| 4,893,248 | A | * | 1/1990 | Pitts et al. ................ 379/92.04 |
| 5,951,642 | A | * | 9/1999 | Onoe et al. .................. 709/224 |
| 6,018,619 | A | * | 1/2000 | Allard et al. ................ 709/211 |
| 6,106,399 | A | * | 8/2000 | Baker et al. .................. 463/42 |
| 6,115,743 | A | * | 9/2000 | Cowan et al. ............... 709/223 |
| 6,308,209 | B1 | * | 10/2001 | Lecheler ...................... 370/230 |
| 6,330,243 | B1 | * | 12/2001 | Strandberg .................. 370/396 |
| 6,345,290 | B2 | * | 2/2002 | Okada et al. ............... 709/204 |
| 6,352,479 | B1 | * | 3/2002 | Sparks, II .................... 463/29 |
| 6,519,628 | B1 | * | 2/2003 | Locascio ..................... 709/204 |

OTHER PUBLICATIONS

WebXRay (James D Cimino) Mar. 1, 1998 (abstract) [online]. Info. Sources Inc. [retrived on Nov. 27, 2002]. Retrieved from: Dialog. ISSN: 1058–2800.*

Taking Charge of ERP (Davis et al) Sep. 21, 1998 (abstract) [online]. Info.Sources Inc. [retrived on Nov. 27, 2002]. Retrieved from: Dialog. ISSN: 8750–6874.*

'EverQuest Quick Take', by Cindy Yans and Jason Cross, publlished by 989 Studios, posted Mar. 18, 1999, (c) 1999 Strategy Plus, 5 pgs.

PC Gamer, Roleplaying Reviews (www.pcgr.com/reviews/roleplaying) showing release date of EVERQUEST of Mar. 1, 1999, 4 pgs.

PC Gamer, Classic Roleplaying Reviews (www.pcgr.com/reviews/classic_roleplaying) showing release date of Ultima Online of Dec. 1, 1997, 2 pgs.

The Geography of Ultima Online (uoam.net/geo.html), 6 pgs.

Ultima Online web site pages including UO Visitor Center (4 pgs), New Player Center (10 pgs), PlayGuide (19 pgs), Support (4 pgs), Update Center (20 pages) and Test Center search including News & Support Archives (22 pages), for 79 total pages.

"Comments" from Lead Server Programmer related to Origin online RPGs, located at Japan Game News Network website at www.jgnn.com/uw/pu–tcom–20001117.html, Nov. 17, 2000.

Mannien, Tony "Comparative Classification of Multi–User Virtual Worlds." approximately 1997 (based on cited references).

Website pages for Meridian 59, http://meridian59.neardeathstudios.com/, copyright 2001–2003.

* cited by examiner

*Primary Examiner*—Teresa Walberg
*Assistant Examiner*—Aaron J. Enatsky
(74) *Attorney, Agent, or Firm*—Lerner, David, Littenberg, Krumholz & Mentlik, LLP

(57) ABSTRACT

An on-line multi-player virtual reality game is provided. A graphical display system associated with each player's computer is used to graphically indicate information about the players, such as the quantity of players within any one of various virtual worlds.

38 Claims, 8 Drawing Sheets

VISUAL DISPLAY SYSTEM FOR MULTI-USER APPLICATION

CROSS REFERENCES TO RELATED APPLICATIONS

The present application claim priority of provisional application Serial No. 60/189,845 filed Mar. 16, 2000.

FIELD OF THE INVENTION

This invention relates generally to multi-user virtual reality systems. More particularly, the invention relates to a multi-player gaming system for use over the Internet by numerous remotely connected users.

BACKGROUND OF THE INVENTION

The Internet has become a popular medium through which much of our traditional social functions are being conducted. E-commerce applications are making personal shopping business-to-business transactions and interpersonal communication easier than ever. Internet-based electronic auctions allow professionals and individuals to post items for sale onto an electronic auction block for which other members of the Internet community may provide competitive bid prices. Electronic interpersonal communications have become common place as individuals and corporations communicate and conduct business with one another through e-mail, online telephony, video conferencing, and other new emerging communication products employing the Internet.

Despite the widespread acceptance of the Internet, the majority of Internet communications constitutes point-to-point communications that do not occur in real-time. Such point-to-point communication occurs when a single entity (person or business) communicates with only one other entity. Thus, electronic point-to-point conversations do not occur in real time and are not available to be seen or heard by anyone other than the two participants within a particular communications domain.

In an electronic auction context, a single server computer may be used to list a particular item for worldwide bidding. However, the multiple users of the electronic auction system do not interact with one another simultaneously and in real-time, as would typically be the case when an item is introduced on an auction block in the real world. Simultaneous, real-time visual and aural perception of large multi-user virtual communities have heretofore not been provided for by any software or computer systems currently in use on the Internet.

Avatar-based chat rooms and shopping malls are examples of Internet-based multi-user systems in which relatively small numbers of simultaneous users communicate with each other over the Internet. For example, ACTIVEWORLDS.COM provides a realistic, 3-D virtual reality chat service in which virtual reality worlds are created and avatar-based caricatures correspond with each other in a 3-D graphical environment. An "avatar", as used herein, refers to the physical incarnation of an online user in the virtual reality world. The avatar may be a scanned image of the user's face, for example, or a more complicated computer-generated charicature for use by the virtual reality participant. Such systems are limited, however, in that only a relatively small number of simultaneous participants typically communicate at any one time.

Further, a practical graphical limit to the number of simultaneous virtual reality users is present with respect to various aspects of the transactional ability of virtual reality computer systems. One difficulty is that a large a number of users will typically overrun the ability of any system to provide simultaneous, real-time communication and interaction particularly when graphics and three dimensional ("3D") avatars and environments are involved. Further complicating these limitations are the computational problems related to the number of multi-point users who may need to perceive one another. These problems increase exponentially with the number of participants. Therefore, a need exists for computer software and hardware systems directed to a large scale multi-user transaction system that facilitates online communication between multiple parties on a simultaneous, real-time basis. A large scale multi-user system of the type needed would support online user communities in which numerous simultaneous users are present within the community and are capable of both aural and visual perception.

One complication in the implementation of a massively multi-player interactive game is the design and implementation of a computer system which can efficiently administer thousands of remote participants in an online virtual community. Two problems to be solved in designing such a system include: (1) creating an efficient system architecture for supporting a large number of simultaneous users; and (2) load balancing the users' transactions among computer servers. Typical computer systems will load balance the number of transactions evenly across all computer servers. This load balancing arrangement may not be desirable in a computer system implementing a virtual reality environment, however, since each server would have to possess a replication of the entire virtual reality in all its transactional variation. Thus, a need exists for a system that can efficiently implement and manage a massive multi-player game of the type described.

Other problems encountered in the design of such a multi-player virtual reality system are the difficulties in designing and implementing the software and computer systems used to monitor the virtual reality community. Much like the real world, a structure for administering to problems and rogue conduct of the users within virtual reality needs to be provided for the numerous users. No centralized monitoring system is currently available in a large scale system to simultaneously answer users' questions, monitor and respond to users' actions and communicate with users of the virtual community on a real-time basis. As a practical matter, administering and monitoring the virtual reality world of thousands of users, including a problem resolution system, system integrity issues, transmission bottleneck detection and elimination and other aspects of the system administration, need to be carefully regulated so that the system runs efficiently and the virtual reality experience provided to the numerous users is as realistic as possible.

Another barrier to the overall usability of a large scale networked multi-user virtual reality system is the relatively large amount of data that the system needs to present to each user. The data is necessary to accommodate the flow of information occurring between participants and the system servers and provide a good graphical rendering of that "person" or avatar. A massive multi-user environment that can accommodate thousands of users must overcome problems associated with providing such information to all users through the administrative computer system so that a virtual reality environment is created. Thus, a need exists for a virtual reality computing system that minimizes the amount of data being transmitted to each of the many users so as to make efficient use of both the computer system's resources and the telecommunications bandwidth that connects the users to the administrative computer system.

In an online virtual reality environment, the transmitted data may include voice or test data for the purpose of permitting the users within the game to communicate with each other and with the system itself. Where the virtual reality environment is a game, such as a role playing game, the data may also include movement commands issued by the players to advance their avatar within the virtual reality environment. Due to the large number of players connected to the game at any point in time, it is advantageous to minimize the size and the latency of the data transmission between the players and the game servers while at the same time preserving some capability to attempt retransmissions for failed data transmissions.

Existing connection oriented protocols, such as the transmission control protocol ("TCP") operating over the internet protocol ("IP"—or "TCP/IP") provide for robust error recovery capabilities. In particular, application messages sent as TCP/IP packets include a sequence number as one element of the TCP/IP packet header, or protocol data unit ("PDU"). The entire message is then sent in sequence as a series of TCP/IP datagrams or segments containing both the TCP/IP PDU and the actual data. An acknowledge message is returned to the sending computer by the receiving computer for each message for which the entire series of segments have been received. If any of the segments are lost in the transmission process, the receiving computer transmits a signal requesting the missing segment. The sending computer responds by retransmitting only the missing segment. As a consequence of this reliability, TCP is inefficient in that the entire sequence of segments must be received by the receiving machine before the message is assembled at the receiving end, even if the message arrives out of turn with other messages. The later assembly of the message may render it outdated or irrelevant in view of later sent, but earlier received messages. TCP/IP does not provide for a independent control over the retransmission capabilities of the message.

As an alternative transport mechanism to TCP, a protocol known as the User Datagram Protocol ("UDP") may be used between computers. A drawback of UDP is that it does not include any error recovery capability for lost datagrams. Instead, UDP sends outgoing datagrams without regard for actual receipt of those datagrams by the receiving machine. While UDP is simple to implement and low in transmission overhead, it does not provide enough error recovery to be useful in an interactive gaming environment that requires some level of certainty that transmitted game information has been received.

Thus, a need also exists for an alternative data transmission protocol to provide a selective and controllable acknowledgement function so as to reliably transmit information between the players and the game servers while at the same time maintaining control of the retransmission of the information.

A player's enjoyment in participating in an online multi-player game is directly related to the quality of the game playing experience, which depends on various factors such as the graphics, audio and interactive activities provided by the game application software. The quality of the graphical presentation, in turn, depends in part on the game software and in part on the quality of the network connection linking the player's PC and the game computer server.

In present online game systems, when a problem arises in the quality of graphics or movement of an avatar, there is no way for the player to know whether such problem is due to a software bug or a network connection. Therefore, a need exists for a graphical indicator to provide the game player with a graphical indication of the quality of the network connection linking the player to the game server so that the player will know if a problem is caused by the game software or the network connection.

Problems related to the rendering of the avatars within the virtual reality also exist due to the limited transmission bandwidth between each user and the administering computer system. In particular, varying levels of detail ("LODs") are needed to efficiently render a realistic representation in a system where there are many participants in a virtual reality environment. The detail of the image is based on the users' proximity with respect to one another and with respect to inanimate objects presented by the system computers in rendering the virtual reality world. In addition, reliable messaging transport mechanisms must be used between a user and the administrative system so that movements of the characters through the virtual reality world are easily and quickly transmitted to the server without incurring large latencies or delay times.

The details further from the player's avatar do not need to be refreshed as frequently as those nearer the virtual character. Likewise, details outside the view of the player's avatar also may not need to be refreshed as frequently as those within the avatar's virtual view. An avatar, like a real person, however, is constantly moving within its environment. This poses problems with regard to updating the field of view with respect to moving players—a problem that is compounded by the potentially large number of players moving in a multi-player environment. Therefore, a need exists for an improved system for providing and updating details in an environment in which a virtual character's view is constantly changing while limiting the transmission bandwidth between the players' computers and the game computer server while maintaining a realistic game appearance for the players.

For these and other reasons, there is a need for a massive multi-user environment administered by the computer system of the present invention so as to facilitate interpersonal interactions in a virtual reality world.

SUMMARY OF THE INVENTION

The system and methods of the present invention are intended to be generally applicable to any virtual reality system capable of supporting numerous remote users. In a preferred embodiment, the system is capable of simultaneously supporting thousands of users. Some features of the preferred embodiments described herein may relate to a multi-player online gaming system sold under the EverQuest™ trademark by Sony Online Entertainment, a division of Sony computer Entertainment America Inc.

Those of ordinary skill in the art will understand that the description below provides exemplary embodiments of the invention and does not limit the scope of the invention to the specific embodiments herein. In particular, various features of the large scale multi-user system and methods described herein may be applied to other online virtual reality environments such as chat rooms, shopping malls and many other virtual reality scenarios in which numerous simultaneous users need to perceive and/or communicate with each other in real-time.

The terms "user" and "player" are used interchangeably herein to refer to the actual person who participates in the virtual reality environment. Similarly, the terms avatar and character are used interchangeably to refer to the representation of the user within the virtual reality environment. Each computer or computer server may be a multipurpose or special purpose computer of varying size and transactional capacity depending on the task they are to perform. As used herein, the terms "computer" and "user computer" are intended to cover any multi-purpose computer, hand held device, game console or any other device that permits a user to connect to and communicate with the multi-user virtual reality game of the present invention. Each computer used to connect a player to the virtual reality environment may be considered a "client." The term "world" should be construed broadly herein to include various locations and environments within the virtual reality environment (e.g., geographical areas that may or may not overlap).

In a preferred embodiment of the invention, a computer system is provided for implementing a virtual reality environment, programmed in software and supporting a multi-user community. The computer system preferably includes a computer server complex including at least one central world server and a plurality of area servers, all of the servers running software to provide the virtual reality environment. The central world server including a processor and running software responsible for administering a unique virtual reality world within the virtual reality environment. The area servers including a processor and running software responsible for administering virtual geographic areas within the at least one virtual world of the virtual reality environment.

It is also preferable for the present computer system to include a plurality of computer server complexes, each of the computer server complexes running the software so as to provide a plurality of the virtual reality worlds.

The present computer system may also include a local area network for connecting a plurality of computer server complexes. A telecommunications complex is preferably connected to the local area network for providing a connection to a telecommunications network including a plurality of user computers (i.e., clients), each having a processor for running software that provides an interface to the virtual reality environment. The plurality of computers are used by players within a network community for interacting in the virtual reality environment.

Another aspect of the invention provides a method of administering a computer system for implementing a virtual reality environment and associated computer readable media, the virtual reality environment being programmed in software and supporting a multi-user community. The computer system preferably includes a login server, at least one world server and plurality of area servers that manipulate avatars. Each of the world servers preferably include a processor for running software responsible for administering a unique virtual world within the virtual reality environment. The area servers preferably include a processor for running software responsible for administering virtual geographic areas within associated unique virtual worlds. The method preferably includes logging a user computer into the virtual reality environment through the login server, and selecting a virtual geographic area within an associated virtual reality world, and assigning one of the area servers to the user computer based on the virtual geographic area selection. The assigned area server will administer the virtual geographic area while an avatar, controlled by the user computer, remains within the virtual geographic area associated with the assigned area server. A different area server will preferably be employed when the avatar exits a particular virtual geographic area associated with a first area server, and enters a new virtual geographic area within the virtual world.

In a preferred method, the computer system is connected to a telecommunications network, and the method includes logging computers into the telecommunications network.

In a further embodiment, the computer system may include a patch server, and the method may include updating software on a user computer with the patch server.

It is preferable for the computer system of the invention to include a visual display on at least one display screen that provides statistical information about a virtual reality environment used by a plurality of users. The computer system including a telecommunications complex and a plurality of world server complexes both connected to an administration server for providing the visual display on a screen. The visual display may include a computer system status area, which provides information about the status of the computer system including the number of the users using the computer system. The visual display may also include a world status area, which provides information about the number of users using each of the world server complexes.

It is preferable for the computer system status area to further include a telecommunications status area, which includes a display of plurality of packets of data being sent and received through the telecommunications complex.

The computer system of the present invention may implement a plurality of virtual reality environments used by a plurality of users wherein the world status area further includes a virtual reality game management area for selecting one of the virtual reality worlds to be displayed in the world status area.

A related aspect of the present invention pertains to a method of creating a visual display on at least one display screen, where the visual display includes information about a multi-user virtual reality game. The at least one visual display may be reviewed and monitored remote from user computer displays by an administrator of the present virtual reality game. The method preferably comprises a utilizing a plurality of world-server complexes to create unique virtual reality worlds in which a user can interact with other users through avatars, operated by user computers connected to the world server complexes. A method also comprises utilizing an administration server connected to the plurality of world server complexes and the plurality of user computers through a telecommunications network. A visual display is provided on at least one display screen, where the visual display includes a world status area which identifies a plurality of virtual worlds and information about the number of user computers logged into the plurality of virtual worlds.

A method may comprise displaying information about the number of users who have submitted questions about the virtual reality game within the world status area. The users of the virtual reality game may be assigned at least one status level based on their achievements within the game. The method may further comprise displaying information within the world status area about the quantity of users at particular status levels logged into the plurality of virtual worlds.

The method may also comprise displaying a computer system status area within the visual display on at least one display screen, where the computer system status area identifies information about the number of users utilizing the computer system. A telecommunications status area may be displayed within the computer system status area, wherein the telecommunications status area includes information about the number of packets of data being sent and received through the telecommunications complex of the computer system.

In an embodiment where the computer system includes a plurality of routers, the method may comprise arranging a router status area as part of the computer system status area. The router status area may identify information about the overall flow of packets of data through the administration server. The router status area may also identify information about the elapsed time since the last user logged into the computer system. The router status area may also identify the average quantity of data for each user handled by routers of the telecommunications network.

In accordance with a related aspect of the present invention, a computer system is provided for implementing a virtual reality game used by a plurality of users. The computer system may comprise a telecommunications complex; a plurality of world server complexes; a plurality of user computers connected to the world server complexes through the telecommunications complex; and an administration server connected to the plurality of world server complexes and the plurality of user computers through the telecommunications complex. A visual display is created on at least one display screen for providing statistics about the computer system. The visual display preferably comprises a world status area identifying a plurality of virtual reality worlds and including information about the number of user computers logged into one or more of the plurality of virtual worlds.

The visual display may also include various information discussed above in connection with preferred methods of the present invention.

In another embodiment of the invention, a computer messaging system is provided for implementing selective retransmission of messages between communication end points of a communication channel. It is preferable for at least some of the messages to have a retransmission indicator, which provides a retransmission of the message when an initial transmission failure for the message occurs. It is also preferable for the system to include a connection object being instantiated at the communication end points. The connection object includes a timeout tracking object for calculating a timeout value related to a round-trip messaging time for the communication channel, and a bandwidth tracking object for calculating a transmission bandwidth for the communications channel. The connection object preferably also includes an outbound queue for storing the message prior to the initial transmission failure of the message over the communications channel; and an outstanding queue for storing the message to be retransmitted over the communications channel upon the initial transmission failure.

Preferably, the timeout value within the timeout tracking object includes a ready for retransmission value for determining a retransmission time for the message in the outstanding queue.

It is also preferable for the message to be sent over the communications channel when the transmission bandwidth exceeds a number of messages in the outbound queue by a threshold value.

In another embodiment, a computer messaging method and a computer readable media are provided for implementing a selective retransmission of messages through a communications channel. The messaging method may include selecting a message as a retransmittable message, and storing the selected message in an outbound queue, and sending the message over the communications channel, and storing the selected message in an outstanding queue if an acknowledgement is not received in response to the sent message, and resending the selected message.

It is preferable for the method and computer readable media discussed above to further include determining a ready for retransmission value, where the resending of the selected message occurs accord to the ready for retransmission value.

It is also preferable for the method and computer readable media discussed above to further include determining a transmission bandwidth threshold for the communications channel, where the selected message is sent occurring according to the transmission bandwidth threshold.

A preferred computer messaging system for implementing selective retransmission of messages between communication end points of a communication channel may include a group of messages to be transmitted over the communications channel. A connection object is programmed as part of a virtual reality environment for selecting messages containing significant data from the group of messages, and a retransmission object is programmed as part of the virtual reality environment for retransmitting the selected messages. The retransmission object will retransmit the selected messages only after a first unsuccessful transmission of the selected messages over the communications channel.

In another aspect of the invention, a visual display system is provided for displaying information related to a network connection. The visual display preferably includes a packet transmission bar, which provides graphical and numerical information related to the network connection. Such information may include instantaneous bandwidth information indicative of the network connection and instantaneous round trip transmission time information for the network connection. The visual display preferably also includes an outbound packet status bar within the packet transmission bar for providing a graphical outbound packet status and a numerical outbound packet loss value, the outbound packet status bar including areas representing lost outbound packets as indicated by an unacknowledged transmission over the network connection. An inbound packet status bar may also be arranged within the packet transmission bar for providing graphical inbound packet status and a numerical inbound packet loss value, the inbound packet status bar including areas representing lost inbound packets as indicated by a missing packet sequence value received over the network connection.

The areas representing the lost outbound packets of the visual display system discussed above preferably advance along the outbound packet status bar as additional packets are sent over the network connection, wherein the areas representing the lost inbound packets advance along the inbound packet status bar as additional packets are received over the network connection.

The outbound packet status bar and the inbound status bar discussed above are preferably disposed-end-to-end within the packet transmission bar, the adjacent ends representing a packet status for a most recently sent packet and a most recently received packet respectively.

It is preferable for a method associated with the visual display system discussed above to provide such system with information related to a network connection, the graphical display including a packet transmission bar having an outbound packet status bar portion and an inbound packet status bar portion. The method preferably includes displaying an outbound indicator at one end of the outbound packet status bar portion for outbound packets that are unsuccessfully sent over the network connection, and advancing the outbound indicator along the outbound packet status bar portion as additional packets are sent over the network connection. It is also preferable to display an inbound indicator at one end of the inbound packet status bar portion for inbound packets that are unsuccessfully received over the network connection, and to advance the inbound indicator along the inbound packet status bar portion as additional packets are received over the network connection.

The method and computer readable media discussed above may also provide a bandwidth value that is indicative of a bandwidth of the network connection.

The method and computer readable media discussed above may also provide a delay value indicating a round trip delay time for a packet on the network connection.

The present invention also contemplates a visual display for providing information related to a network connection including a packet transmission bar for providing a first graphical indicator related to the network connection. The packet transmission bar including an outbound packet status bar for providing a graphical indication of lost outbound packets and a numerical outbound packet loss value. The packet transmission bar also includes an inbound packet status bar for providing a graphical indication of lost inbound packets and a numerical inbound packet loss value.

It is yet another aspect of the present invention to provide a method of providing efficient transmission of data related to visual objects from a point of view of an avatar within a virtual reality environment. One preferred method may comprise providing data representative of an avatar within the virtual reality environment; determining a point of reference location of the avatar within the virtual reality environment; providing data representative of visual objects other than the avatar within the virtual reality environment; and updating the data representing visual objects other than the avatar at a frequency dependent upon the proximity of the objects to the point of reference of the avatar.

The method may also comprise providing a plurality of proximity ranges relative to the point of reference location of the avatar within the virtual reality environment. Different update frequency periods are preferably assigned to respective ones of the plurality of proximity ranges, defining the frequency at which certain updated data will be transmitted within the plurality of proximity ranges. It is also preferable for the method to comprise updating data which is representative of objects other than the avatar within the virtual reality environment at the frequency assigned to the respective plurality of proximity ranges.

A method may also comprise updating data which represents objects other than the avatar, based on relative movement of the avatar to the other objects within the virtual reality environment.

In yet another embodiment, the method may comprise assigning various priority values to the objects other than the avatar relative to each other within respective proximity ranges, whereby data representing the objects within each proximity range that is assigned a higher priority value than other data within the same proximity range will be updated more frequently than the other data.

It should be appreciated that the method in accordance with this aspect of the present invention may be related to various visual objects, rather than specifically representative of such objects. For instance, the data may relate to the state of a virtual animal, such as full of energy, injured, dying, or dead, whether the animal is moving quickly, slowly, etc.

It is yet another aspect of the invention to provide a system for implementing a bandwidth efficient communications channel between a server supporting a virtual reality environment and a computer for allowing a user to operate within the virtual reality environment. A point of reference is selected within the virtual reality environment. A plurality of proximity ranges relative to the point of reference exist within the virtual reality environment. The plurality of proximity ranges preferably include a first proximity range for an element near the point of reference within the virtual reality environment. A view frustum having a center line containing the point of reference also exists within the virtual reality environment along with a plurality of proximity ranges relative to the view frustum. A plurality of second proximity ranges exists for determining a second proximity range for the element near the point of reference within the virtual reality environment. Messages may be sent over the communications channel, the messages having data regarding a change of position for the element as perceived by the user through the view frustum from the point of reference. A plurality of update frequencies for the messages may also be sent over the communications channel, the update frequency being correlated in generally increasing relation with generally increasing proximity to the point of reference as indicated by both the first and second proximity ranges. A particular update frequency may be selected from the plurality of update frequencies for sending the messages based on the first and second proximity ranges.

The system discussed above may further include a weighting module programmed as part of the virtual reality for weighting the first and second proximity ranges in the selection of the particular update frequency. It is preferable for the data regarding a change in position to represent different types of movements for the point of reference and the view frustum, the different types of movement being represented by data having different bit lengths.

Another embodiment of the present invention provides a method of and computer readable media for determining a particular update frequency for a messaging system. The messaging system implementing a bandwidth efficient communications channel between a server supporting a virtual reality environment and a computer for allowing a user to operate within the virtual reality environment. The virtual reality environment being presented to the user on the computer with respect to a point of reference within the virtual reality environment. The method including determining a first proximity range for an element from a plurality of proximity ranges relative to the point of reference, and determining a second proximity range for the element from a plurality of proximity ranges relative to a view frustum, the view frustum having a center line containing the point of reference. A plurality of update frequencies are preferably correlated in generally increasing relation with generally increasing proximity to the point of reference as indicated by both the first and second proximity ranges. A particular update frequency is selected for messages within the messaging system from the plurality of update frequencies based on the first and second proximity ranges, the messages having data regarding a change of position for an element perceived by the user from the point of reference.

The first and second proximity ranges may be weighted in the selection of the particular update frequency. It is also preferable for data to be provided, where the bit length thereof may vary based on the representation of a type of movement for the point of reference and the view frustum.

The present invention also includes a system for implementing a bandwidth efficient communications channel between a server supporting a virtual reality environment and a computer for allowing a user to operate within the virtual reality environment. The virtual reality environment being presented to the user on the computer with respect to a point of reference within the virtual reality environment, including a circle of proximity centered on the point of reference and indicating a proximity range for an element near the point of reference within the virtual reality environment, and a field of view having a foci at the point of reference. The field of view overlapping a portion of the circle of proximity and including the element. The system contemplates messages sent over the communications channel, the messages having data regarding a change of position for the element, and a plurality of update frequencies for the messages. The update frequency being correlated with the location of the element within the circle of proximity or the field of view. The update frequencies generally increasing with generally increasing proximity to the -point of reference and the field of view.

The foregoing features of the present invention will be better appreciated with reference to the following detailed description of the preferred embodiments and accompanying drawings.

DETAILED DESCRIPTION OF THE PREFERRED EMBODIMENTS

Figure 1:
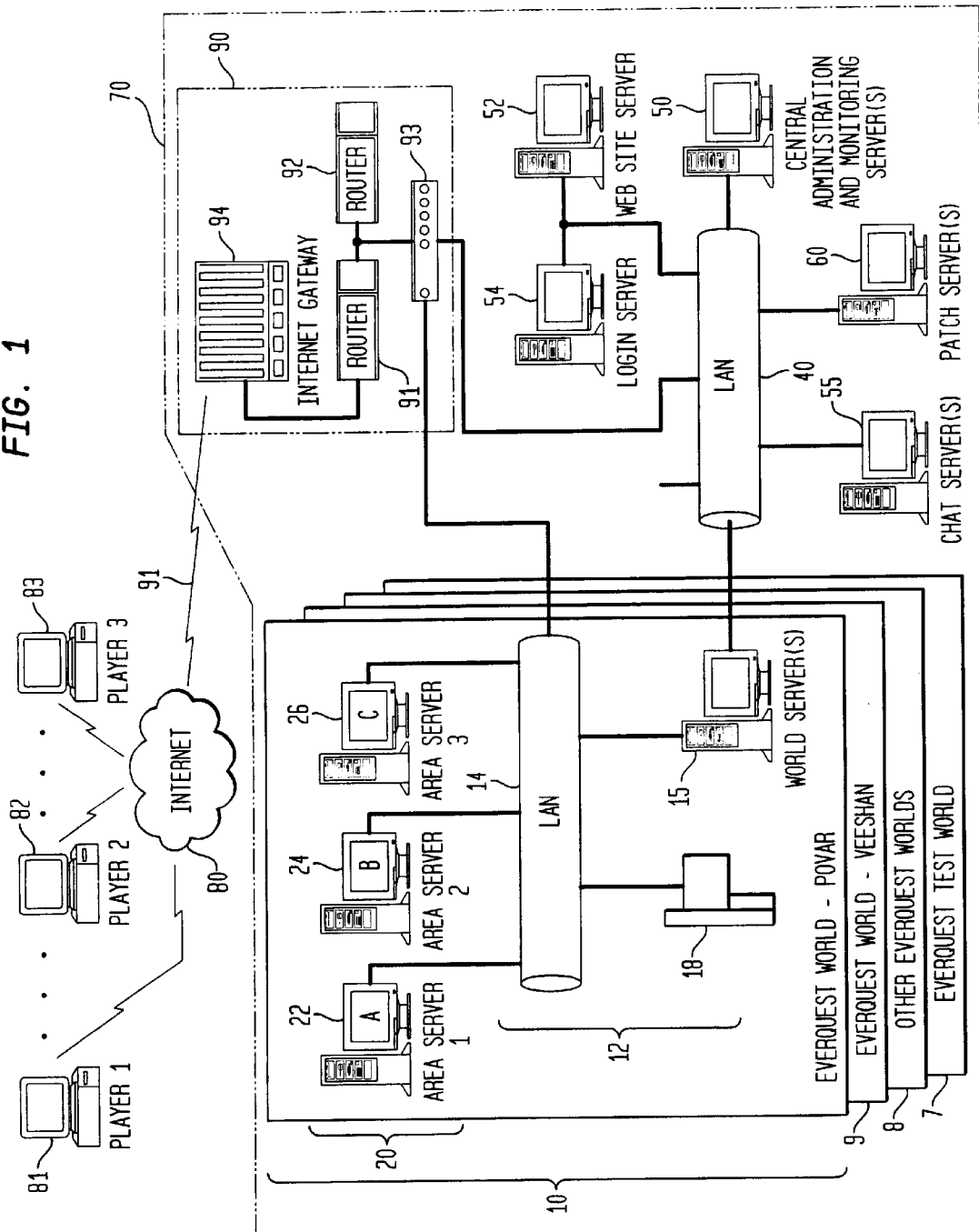
FIG. 1 is a network diagram of a computer system for operating a large scale multi-player game according to one embodiment of the present invention.

Referring now to FIG. 1, a large scale multi-player virtual reality game system 70 according to a preferred embodiment of the present invention is provided. Although various aspects of the present invention are employed in the EverQuest™ game, and specific examples of the EverQuest™ game are referenced herein, it should be understood that all aspects of the present invention are not necessarily employed in the EverQuest™ game. The multi-player system of the present invention consists of a computer server complex used to administer a number of virtual reality worlds in which the players may interact. Computer software to implement the virtual reality worlds is generally distributed throughout the computer server complex 70, including possibly to user consoles 81–83. The software operates on the users' computers 81–83 and the computer servers as described.

Each of the virtual worlds are administered as a separate world complex 7–10. Each world server complex is connected through a world server network 12 and includes at least one central world server 15 connected via a local area network ("LAN") 14 to other world administration servers 18. The central world server 15 is responsible for the overall administration of that virtual reality world and world server complex, including the movements of the avatars within the world, the interaction of the inanimate elements of the world with the avatars and, in general, the overall administration of the game play within the world. Other administrative servers 18 may be provided to coordinate other aspects of the virtual reality world.

Area server group 20, including area servers 22, 24, and 26, are also connected to the world network 12 via world LAN 14. Each area server is programmed within each world server complex to govern and administer a particular geographic or physical area within the virtual reality world. In the example of FIG. 1, if the EverQuest™ world of Povar had three different geographic areas labeled A (a city of Erudin), B (a city of Felwithe) and C (a city of Halas), then area server 22 might be responsible for administering all activity taking place within the city of Erudin. Likewise, area server 24 might be responsible for administering all of the activity taking place within the city of Felwithe and area server 26 might be responsible for administering all of the activity taking place within the city of Halas. As such, the world servers' administration of an avatar's interaction with the world would be shifted from one world to another as the avatar moves from one geographic area within the virtual reality world to another.

The organization of the game system responsibilities among area servers 22–26, where each server administers a unique, non-overlapping geographical sector within the virtual reality world, and provides significant advantages over other load balancing techniques among system servers. One advantage is that each area server need only possess system programming information related to a specific geographic area. In a transaction load balanced system in which each world server handles an equal number of avatars, each world server would have to possess the capability of administering each of the virtual reality geographical areas.

In the virtual reality system of the present invention, where there are numerous players, the administrative overhead of load balancing between servers in this manner would be prohibitive in that the computational overhead in mimicking the avatar's interactions on all other servers would outweigh any benefit gained by distributing the load. This is in contrast to other transaction systems in which the interactions are insular with respect to the participants and are relatively short-lived.

Another advantage of the area server arrangement of the present invention is that each area server need only hold the software programming necessary to operate one virtual reality geographic area. Thus, software updates to a particular geographic area are easily made to the one area server without interrupting the operation of the other geographic areas.

It should be recognized that although each area is administered by an area server, redundancy of hardware and software may still be provided for that area by implementing a copy of the system activities on another server operating in parallel. Further, dynamic distribution of the load to a plurality but not all of the area servers, a per the load balancing arrangement above may be desirable when the number of avatars overrun the transactional capability of one area server.

As shown in FIG. 1, the virtual reality system 70 of the present invention may also include a test server complex 7 as one of the world server complexes in which players may operate avatar's to test beta versions of new game software. Thus, test server complex 7 provides for a safe world testing environment for new software releases prior to the introduction of that software into the other active world server complexes 8–10.

World server complexes 7–10 are connected via system LAN 40. System LAN 40 also provides connections to at least one global administration computer, which may include various other servers such as a central administration and monitoring server 50, a chat server 55, an Internet web site server 52, a login server 54 and a software patch server 60. Central administration and monitoring server 50 include computers for monitoring the actual operations within each of the virtual reality worlds so as to facilitate smooth operation of those worlds and detect and report errors in the operation of the associated servers. Login server 54 provides a common front-end interface for all player logins, authentication and messaging. Web site server 52 manages the web site used by the players and provides information related to the game. Patch server 60 provides software updates for the players upon logging into the game through login server 54. Chat server 55 provides administrative functions for allowing players operating within the game to communicate with one another outside the context of the gaming world structure.

Telecommunications complex 90 in virtual reality system 70 is also connected to system LAN 40. Telecommunications complex 90 includes routers 91 and 92, hub 93 and Internet gateway 94. Telecommunications complex 90 provides a high bandwidth access connection 96 to the Internet 80. Telecommunications complex 90 may also be connected to other telecommunications networks (not shown).

Game players may employ personal computers, hand held devices or any other game stations 81–83 (e.g., the Sony PlayStation2™ console) to connect to the virtual reality game system 70 through the Internet. These user connection devices are generically referred to as user or game consoles. Modems, cell phones and other connection mechanisms may be used to make these connections. Each of the game consoles 81–83 contains a processor and software that provides access and an interface to virtual reality system 70. This software may be considered part of virtual reality system 70.

In operation, the game players perform the following steps to initiate playing the multi-player game. First, a player logs onto the Internet 80 using a computer or game console 81 to connect with website server 52 via telecommunications complex 90. Login server 54 is then used to validate or authenticate the player's login information. Upon authentication, patch server 60 is contacted to inform the player as to available software updates and patches which may be needed to play the game and/or enhance the player's usability of the game. The software presented to the user for updating may vary depending on the virtual reality world in which the user wishes to play. For example, if the user intends to play in the test world 7, numerous software patches and updates may be needed since that software is frequently updated as a result of the real-time testing by online users.

Next, the user selects the world complex in which he wishes to play. Maintenance updates and software patches are then provided if necessary for the selected world by patch server 60 upon logging in and authentication by login server 54.

Once the login and software update processes are completed, the computer 81 will display the player's avatar within one of the virtual reality worlds 8–10. One of the area servers 22–26 in area server group 20 will be active and operating for the benefit of a player to provide an appropriate "look and feel" in that particular geographic area. The player would then move about that particular geographic area using the game console keyboard, joystick or other controller or graphical user interface so as to perform discrete tasks within that geographic area. As the player's avatar transverses from one geographic area administered by one of the area servers 22–26 into another geographic area administered by another area server 22–26, the game system software transfers the control of the virtual reality presentation between the servers. As the avatars move about the particular virtual reality world and perform various tasks within that world, central world server 15 administers the overall operation of the game, including the presentation of tasks and the events that transpire asynchronous to the player's input, among various other game enhancing functions.

Players who wish to conduct a real time "out-of-role" conversation with other players logged into any of the worlds 7–10 may use the services of chat server 55.

Game Monitoring System

Figure 2:
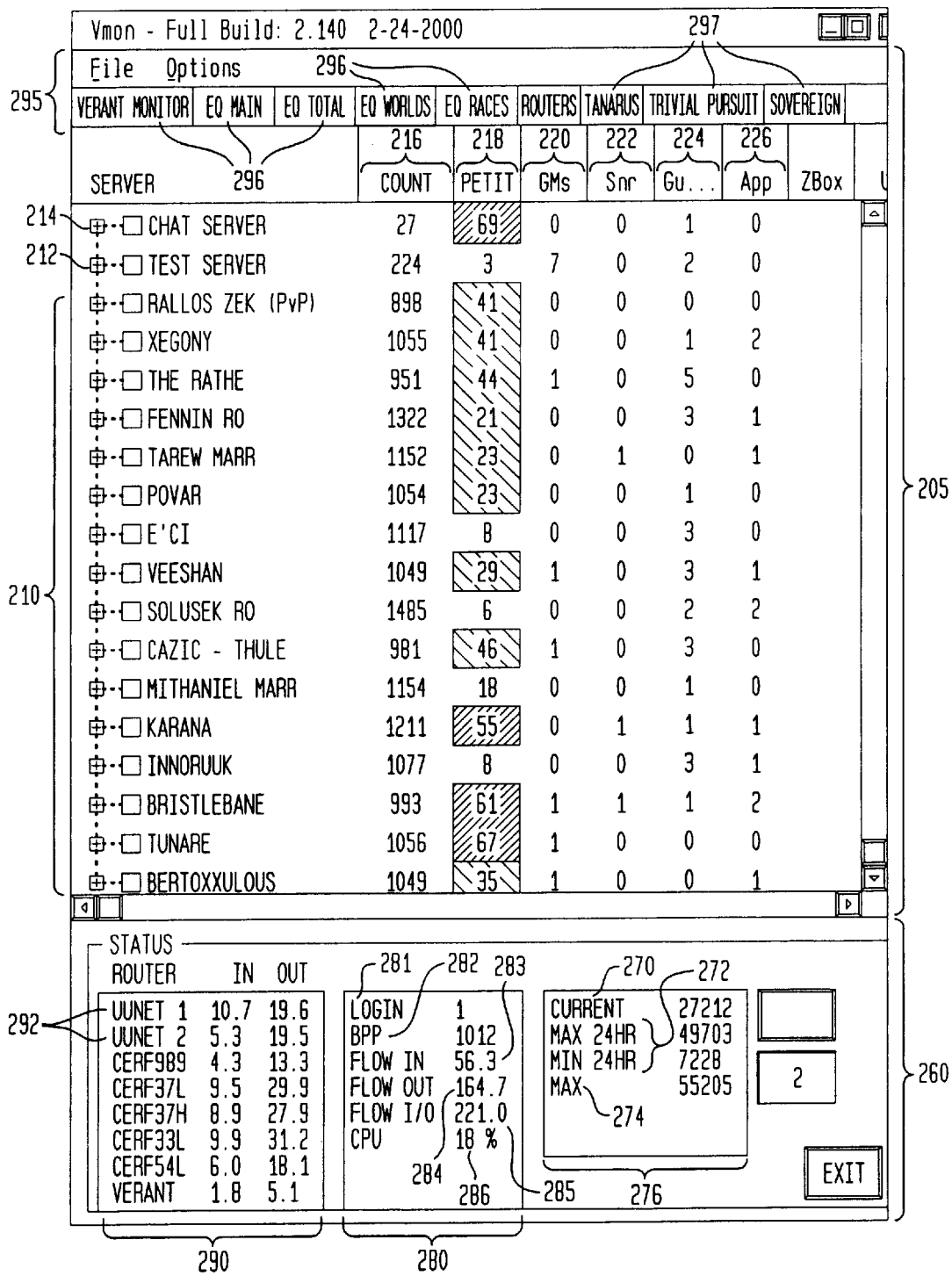
FIG. 2 is a monitor screen display of an interface used to monitor and manage the large scale multi-user system according to one embodiment of the present invention.

FIG. 2 is a monitor screen display that illustrates information provided by the monitoring software running on the central administration and monitoring server 50 in FIG. 1. As shown in FIG. 2, the software displays information including statistics related to several of the computer system servers, such as the test world server complex 7 and the chat server 55. Relevant statistics 210 relate to computer server complexes. Statistics for the user test world server complex 7 are shown as element 212, and statistics for the chat server 55 are shown at 214. This information is presented for the overall administration of the multi-player game within world status area 205.

The monitoring system software presents data used to monitor the administration of the virtual reality game. The following information, for example, is contained within the columns in world status area 205: the number of users (i.e., the "count") within each of the identified worlds (e.g., "Rallos Zek," "Xegony", "The Rathe", "Fennin Ro", etc.) 216, the number of users who have submitted petitions (i.e., "Petit"—representing questions regarding the game) 218, and the number of game masters (i.e, "GMs") 220 currently administering the games within each world. Further, the number of senior guides (i.e., "Snr") 222, regular guides (i.e., "Gu") 224, and apprentice guides (i.e., "App") 226 are shown for each of the worlds within world status area 205.

Highlighting within the petition information field 218 is used to indicate the severity of the outstanding petitions based on the number or nature of the petitions. Petitions typically require a response from either the game masters or guides. A large number of outstanding petitions may be indicated with a darker highlight as shown in FIG. 2. The Karana World, for example, indicates 55 outstanding petitions, which is significantly greater than that for most of the other worlds and is therefore highlighted in a dark red color (not evident from the black and white rendering). Although levels of decreasing administrative needs may be highlighted in other colors (also not evident from the black and white rendering of FIG. 2) for example, as shown by the lighter highlight color for the 41 outstanding petitions in the Xegony world.

Game system status area 260 includes various statistics related to the overall operation of the game system 70. Specifically, telecommunications status 290 provides network packet flow information occurring through Internet gateway 94. Player information area 276 provides information related to the number of players or users of virtual reality system 70. Router status area 280 provides information related to the routers used in the telecommunications complex 90.

Telecommunications status area 290 provides packet transmission information for routers 91 and 92 of FIG. 1 as well as other components of telecommunications infrastructure 90. For example, the quantity of packets of information being sent in and out of those routers is displayed in two columns within telecommunications status area 290. Other telecommunications status information related to telecommunications services provided at Internet gateway 94 are also available as shown at 292.

Player information box 276 provides the current number of players 270 participating in the virtual reality game environment, the maximum and minimum number of players within the last twenty-four hours 272, and the peak maximum number of players 274.

Router status area 280 displays the overall flow of packets of information through the central administration and monitoring server 50. In particular, router status area 280 includes the elapsed time, in seconds, since the last player logged in (i.e., "Login") 281, the an average number of bytes per player being handled by the routers in the telecommunications complex (i.e., "BPP") 282, the total number of packets (i.e., "FLOW I/O") 285 flowing through all of the routers, including packets flowing in (i.e., "FLOW IN") 283 and packets flowing out (i.e., "FLOW OUT") 284 and a total CPU usage (i.e., "CPU") 286 for the routers in the telecommunications complex.

Virtual reality game management area 295 is provided on top of the monitor display in world status area 205. Game management area includes selection buttons 296 and 297 for selecting a particular game to monitor or administer. Four different tabs are shown for the EverQuest™ game: EQ Main, EQ Total, EQ Worlds, EQ Races. These tabs may be selected with a graphical user interface in the monitoring system to indicate different displayable aspects within the EverQuest™ worlds. Other games which are simultaneously run by the monitoring and administration server system 50 of FIG. 1 may be displayed by selecting other game tabs 297. In the example of FIG. 2, tabs are included for monitoring the large scale multi-player online games Trivial Pursuit, Sovereign and Tanarus.

Appendix A is included at the end of this application and thus forms an integral part of the specification hereof. It provides more specific details from EverQuest™ user manuals for *The Scars of Velious and The Ruins of Kunark*, as well as Customer Service Guidelines for guiding the game masters and apprentices' responses to the petitions during the operation of the game.

Game Play

The EverQuest™ game is an online role play game ("RPG") in which players encounter numerous virtual reality worlds in their quest for adventure. It has many unique design attributes that allows thousands of players to simultaneously participate in a real time virtual reality environment. Each player creates and manipulates a character (i.e., an avatar) to be used within a virtual reality world. However, the EverQuest™ game is programmed in software and resides on the virtual reality system 70 of the present invention. Each player "creates" an avatar by specifying various attributes for such avatar that the player wishes to employ in the game. Once the avatar is created and the attributes for that avatar are determined, the player may then introduce the avatar into the EverQuest™ game-playing environment.

Once in the desired EverQuest™ world, the player directs the movement of the avatar around the simulated virtual reality environment to undertake missions and quests in an effort to find treasures and gain experience for the avatar. In so doing, the capabilities and attributes of the avatar are advanced. By undertaking more quests and spending more time with the avatar, a player may advance the avatar through various experience levels thereby strengthening the abilities of the avatar to operate within the RPG. During the course of play, the character also interacts with other player's avatars and with avatars known as non-role playing characters ("NRPCs"), i.e. those avatars not operated by a player but operated by the system 70.

A number of attributes will typically be specified by the player in creating his or her avatar. For example, an avatar race from the list of: Barbarian, Dark Elf, Dwarf, Erudite, Gnome, Half Elf, Halfling, High Elf, Human, Ogre, Troll and Wood Elf should be selected. Based on the race of the avatar, a geographic starting point within the game for the introduction of the avatar into the virtual reality environment is preselected by the EverQuest™ system. In addition to the avatar's race, a class or occupation must be chosen from one of the following: Bard, Cleric, Druid, Enchanter, Magician, Monk, Necromancer, Paladin, Ranger, Rogue, Shadow Knight, Shaman, Warrior and Wizard. Based on the class chosen for the avatar, various abilities and avatar are imputed to the avatar for specialized use within the EverQuest™ environment. For example, a warrior may have abilities which relate to the wielding of a sword or the efficient use of attack weapons for simulating combat with other RPCs and avatars within the EverQuest™ environment. Wizards, on the other hand, have the ability to cast spells thereby interacting with the EverQuest™ environment in an entirely different manner.

The physical and mental make-ups of the avatars are also determined prior to the introduction of the avatar into the RPG. The strength of the avatar's abilities affects the performance of the avatar in combat situations within the role-playing environment. The abilities available within the EverQuest™ game include strength, stamina, agility, dexterity, wisdom, intelligence and charisma. Each race or class may have its own ability modifier that affects the level of each of the above-mentioned abilities. Finally, other attributes of the avatar may be chosen, such as the face of the avatar, the avatar's name, and a religion of the avatar.

Publicly available manuals provided to customers of the EverQuest™ game, and books and manuals sold separately, provide additional details regarding the operation of the EverQuest™ game. The content of such books and manuals are incorporated herein by reference.

Reliable Datagram Protocol ("RDP")

It is an advantage within the large scale multi-player gaming environment, for the application or game software to provide assurance that certain classes of messages will be received with a high degree of certainty and with selective control over the retransmission of failed messages. Certain messages sent between computer 81–83 and the world server complex 10 do not need to be retransmitted, and in fact, may cause problems if they are retransmitted with a significant delay with respect to other messages. For example, messages related to movement of the avatars are much more tolerant of packet loss since an avatar's position may be interpolated from the previous position message with subsequent movement message being used to adjust the interpolative techniques in determining subsequent positions. The loss of other messages related to the avatar, however, such as a weapon strike against an opponent, would more seriously interfere with the ease of play and enjoyment of the game.

It should be noted that the particular RDP provided for in the present invention is substantially different from the known RDP protocol found in the Internet RDPs 908 and 1151. The RDP of the present invention can also be considered a selective retransmission transport protocol, which will be described in more detail below with respect to FIGS. 6A and 6B. Further the terms messages, packets and datagrams are used interchangeably to refer to the increments of data sent between the world server complexes and the user consoles.

Figure 3:
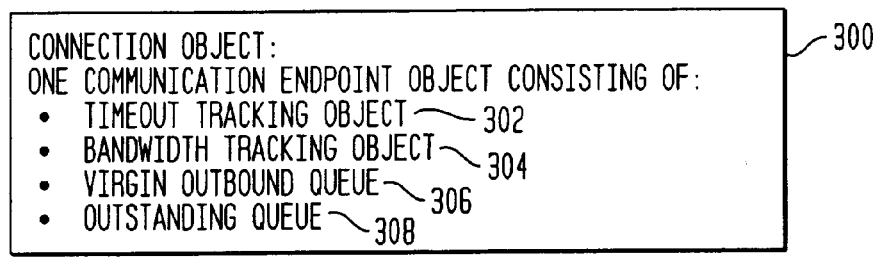
FIG. 3 is a schematic representation of the initiation and maintenance of a user's network connection according to one embodiment of the present invention.

FIG. 3 shows a software connection object 300 for establishing and maintaining one endpoint of two-way communication between the player's computers 81–83 and the central world server 15. The connection object consists of a time out tracking object 302, a bandwidth tracking object 304, and two data queues: (1) a virgin outbound queue 306, and (2) an outstanding queue 308. The connection object is an object that is programmable in software using any of the object oriented programming languages and is instantiated by the game software at both ends of the communication channel to effect transmission between the two endpoints.

The timeout tracking object 302, includes programming code that calculates the following statistics for use in the RDP transport protocol. First, the time out tracking object 302 calculates an average transmission round-trip time as the moving average of the actual round trip times of the last 64 RDP datagrams sent between one of the computers 81–83 and the world server complex 10. A round-trip time is defined as the time between the sending of a single datagram and the receipt of the acknowledgement from the receiving computer, but only with respect to datagrams that have not been resent. Typical average round trip times, for example, are on the order of 100 milliseconds. Of course, this time can vary widely depending on the network technology used to transmit the data, the quantity of data, the type of data, etc. Second, the timeout tracking object 302 calculates a standard deviation for the last 64 RDP datagrams sent between one of the computers 81–83 and the world server complex 10. Typical standard deviations for the round trip times, for example, are on the order of 10 milliseconds although the distribution is not a typical bell curve and the error is more densely distributed in the direction of the longer delay times. Third, the timeout tracking object 302 calculates an "ancient" timeout value as being the average round trip time plus a multiple of the standard deviation. The "ancient" timeout value is used by the RDP transmission protocol as the determinant of when a failed transmission should be re-attempted at a last time. Finally a "ready for retransmission" variable is calculated by the timeout tracking object 302 as being equal to the average round-trip time plus a multiple of the standard deviation. The "ready for retransmission" variable is used by the RDP protocol to determine the appropriate time for retransmitting an unacknowledged packet.

The bandwidth tracking object 304 includes programming code that calculates and stores the following statistics for use in the RDP transport protocol. First, the bandwidth tracking object 304 is responsible for calculating an instantaneous average bandwidth for the connection existing between a pair of connection objects constituting a particular communication channel. The instantaneous average bandwidth is typically measured in bytes per second. Second, the bandwidth tracking object 304 maintains a variable representing the virgin outbound queue data size.

Figure 4:
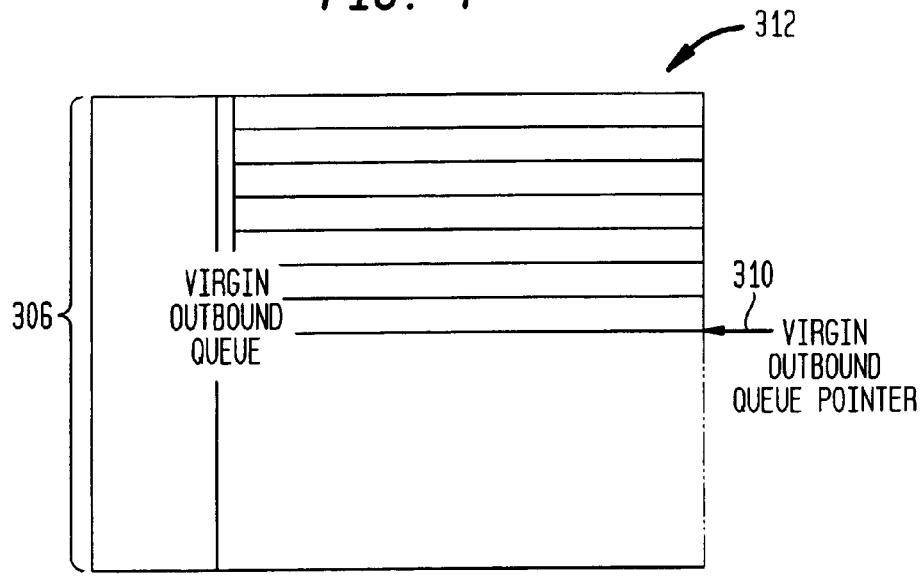
FIG. 4 is a representation of a connection data queue for maintaining an outgoing message list according to one embodiment of the present invention.

The virgin outbound queue 306 is part of the connection object and is shown in FIG. 4. The virgin outbound queue 306 consists of a data structure 306 including a virgin queue pointer 310 that indicates the current packet to be transmitted. As the central world server 15 or the player's computer 81–83 accumulates data to be transmitted, the data is added to the bottom of the virgin queue 312. The virgin queue pointer 310 always indicates the next data packet to be sent. After each packet is sent, the packet is removed from the queue and the virgin outbound queue pointer 310 is repositioned to indicate the next packet. As the queue fills and empties of data, the virgin outbound queue pointer 310 floats within the memory space allocated to the virgin outbound queue 306 to indicate the next data packet to be transmitted. When the virgin outbound queue 306 is empty of data, the virgin outbound queue pointer 310 is set to the end of the queue 312 indicating that no remaining packets are to be transmitted.

Figure 5:
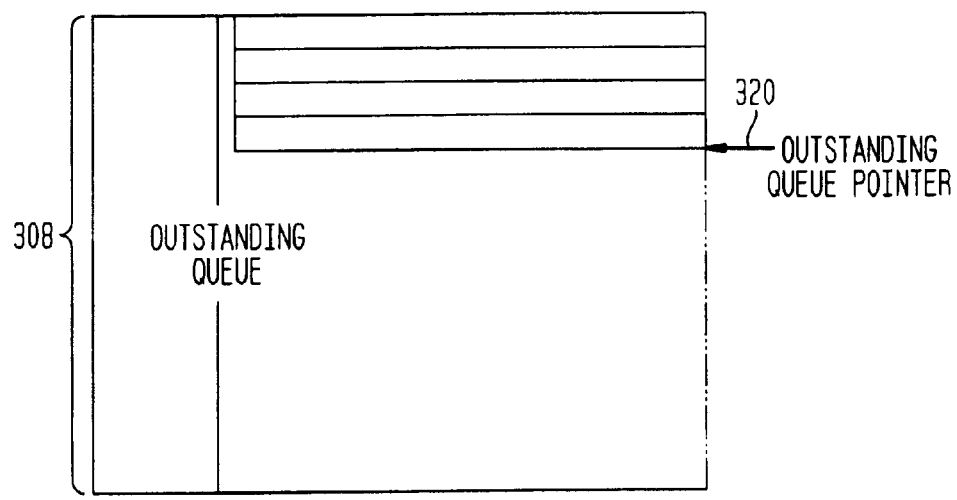
FIG. 5 is a representation of another connection data queue for maintaining an outgoing message list according to one embodiment of the present invention.

The outstanding queue 308 is also part of the connection object and is shown in FIG. 5. The outstanding queue 308 operates similarly to the virgin outbound queue 306 with respect to the filling and emptying of the data and the movement of the outstanding queue pointer 320 to indicate the "next-to-be-sent" data item 320. The outstanding queue 308 is populated with packets for which at least one transmission attempt has occurred from the virgin outbound queue 306, but has failed for some reason in that the receiving computer did not acknowledge receipt of the packet. Failed transmission packets moved to the outstanding queue 308 from the virgin outbound queue 306 remain in the outstanding queue 308 until it is determined that transmission attempts with respect to that packet are to be terminated as described below with respect to the transmission flow shown in FIGS. 6A and 6B.

Figure 6A:
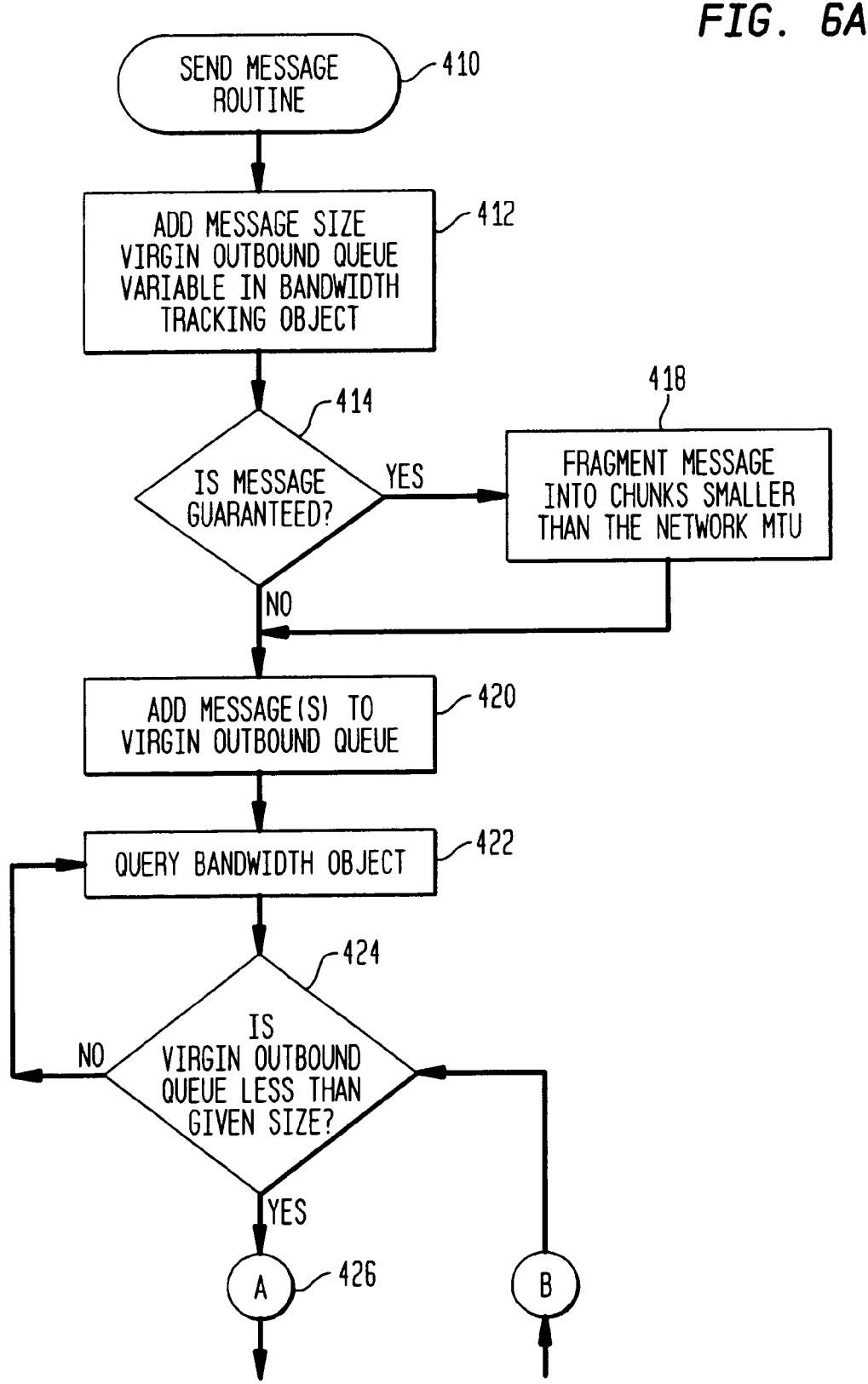
FIG. 6A a flow diagram for sending messages within the multi-user virtual reality system according to one embodiment of the present invention.
Figure 6B:
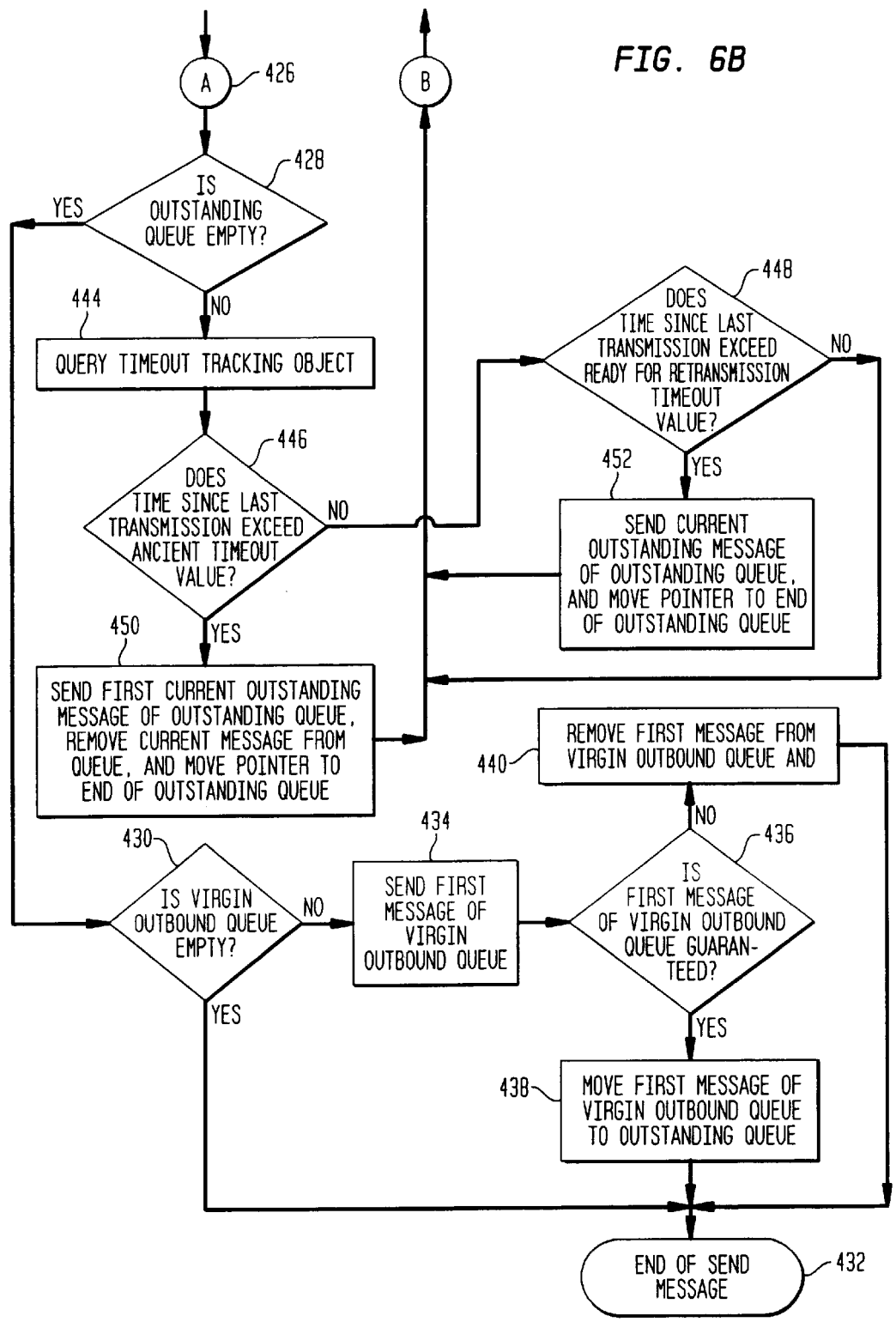
FIG. 6B is continuation of the flow diagram of FIG. 6A according to one embodiment of the present invention.

FIGS. 6A and 6B show a preferred embodiment of the overall processing flow for implementing the RDP transmission of the present invention. In particular, a game application program issues a "send message" function call 410 to send a message to the remote player's computer 81 of world server complex 10 at the other end of the established connection. The RDP message size is then added to the bandwidth tracking object variable holding the virgin outbound queue size 412.

One novel feature of the selective acknowledgement function is exemplified in step 414 of the RDP algorithm. At step 414, the RDP routine determines whether the message is to be transmitted as a "guaranteed" message. A "guaranteed" message is a message that the application program requires be received by the receiving computer. The game application program implementing the virtual reality system specifies that the message is to be "guaranteed" and that retransmission attempts should be made. In one embodiment, this is performed by setting a bit or a variable (e.g., a flag) within the send message request sent to the connection object.

In one embodiment of the present invention, as provided below, the number of retransmission attempts is based on statistics related to the network connection between the two communicating connection objects. Alternatively, the game application program may specify a number of retransmission attempts. For messages that are not sent "guaranteed", only one transmission attempt is made by the RDP routine.

If the message is guaranteed, the message is then broken up into segments 418 each being smaller than a maximum transmission unit, typically 512 bytes. The size of these segments can vary widely depending on the message being sent and the technology of the system. This ensures that higher level protocols do not further divide up the message, thereby enabling the RDP to retain control over the selective acknowledgement functions related to guaranteed messages. Following the message segmentation, guaranteed and non-guaranteed messages are then added to the end of the virgin outbound queue 420.

Messages contained within the virgin outbound queue 306 are sent out over the communications channel by the RDP only when the channel is operating sufficiently fast to adequately respond to the data contents within the virgin outbound queue. In one preferred embodiment, the RDP queries the bandwidth tracking object 304 to determine whether the channel is ready for sending. The next step within the RDP is to query the bandwidth object to determined the ready status of the channel 422.

Within the bandwidth tracking object, the current average channel bandwidth is compared to the amount of the data in the virgin outbound queue 306 as recorded in the above-mentioned virgin queue data size variable 424. If, for example, the virgin queue data size is less than the some target percentage of the current average channel bandwidth, say 10%, then the bandwidth tracking object will return a "ready to send" status message to the RDP to initiate packet sending 426. It should be recognized that the overall capacity of the virgin outbound queue 306 can be increased or decreased depending upon the current average bandwidth of the communication channel between the two connection objects to more effectively use the channel during channel capacity fluctuations.

Once the ready to send message is received by the RDP, the outstanding queue 308 is queried to determine if there is any data that first needs to be retransmitted at step 428, as shown in FIG. 6B. If the outstanding queue 308 is empty, the virgin outbound queue 306 is queried by the RDP to determine if there is any data to be transmitted at 430. If the virgin outbound queue 306 is empty, the "send message" request is terminated and the RDP routine ends at 432. If the virgin outbound queue 306 is not empty, then the first data message on the queue as indicated by virgin outbound queue pointer 310 is tagged with a message header and sent to the remote connection object at 434.

Following the sending of the message, the message data is queried to determine if the message is a guaranteed message at 436. If the message is guaranteed, it is added to the end of the outstanding queue for later verification that the message was received by the remote connection object at 438. If the message is not guaranteed, the message is removed from the virgin outbound queue at 440.

Upon receipt of an acknowledged signal by the receiving computer 81, the guaranteed sent packet is removed from the outstanding queue at 440 thereby undoing step 438. If at step 428 the outstanding queue is not empty when a message packet is sent, the following additional steps are performed by the RDP prior to sending any messages in the virgin outbound queue 306.

First, the timeout object within the timeout tracking object 302 is queried at step 444. As described above, the timeout object calculates a number of timeout variables related to the first message waiting in the outstanding queue 308 indicated by the outstanding queue pointer 320. It should be noted that the messages in the outstanding queue 308 are ordered according to the sending time of the messages. A determination is then made as to whether the time from the last sending of the current outstanding message exceeds one of either the ancient timeout variable or the retransmission timeout variable calculated by the timeout tracking object as shown at 446 and 448, respectively. If the message transmission time exceeds the ancient timeout variable at 446, then the current outstanding message is sent, the message is removed from the queue and the pointer is advanced one position in the outstanding queue at step 450.

If the current outstanding message transmission time exceeds the retransmission timeout variable as calculated by the timeout tracking object, the current outstanding message is sent and the pointer is advanced one location in the outstanding queue 452.

According t o an alternative embodiment (not shown in the drawings), the program flow from step 424 sequentially performs the three queue tests in following order: first, the outstanding queue query 428 coupled with the ancient timeout variable query is performed at step 450; second, the virgin output queue query 430 is performed; and third, another outstanding queue query 428 is performed coupled with the retransmission timeout variable query 448. It should be noted that variations in the ordering of the programmed testing may be employed to achieve various efficiencies and to provide priority to certain types of retransmissions or to the virgin output queue 306.

In any permutation of the above testing, program flow control returns to step 424 in which the ready to send determination is made. The program continues to loop through the outstanding queue 308 and the virgin output queue 306 according to the flow in FIGS. 6A and 6b until all the messages exceeding their appropriate timeout variable have been sent and the virgin output queue 306 is empty. As additional messages are developed for sending by the application program, function calls are made to the send message routine of the RDP algorithm.

Messaging channel connection objects that have not acknowledged messages sent for an extended period of time are processed by the RDP algorithm as exceptional situations. Typically, the messaging channel is terminated following one of these exceptions. In particular, if the remote connection object 300 does not provide an acknowledgement for thirty seconds, for example, all transmissions related to that connection time out and the channel is removed from service. Error recovery routines :within the application program are then invoked to reinitiate the communications channel and reintroduce the missing messages. Likewise, if a particular message in the outstanding queue 308 does not receive an acknowledgement from the companion connection object within two minutes, then the connection is determined to be broken and the communications channel is terminated.

User Display for Network Connection Monitoring

Variations in the reliability of the above-mentioned network connection may significantly affect a player's enjoyment of the game. Even when using the RDP selective retransmission protocol described above, the Internet 80 itself or telecommunications complex 90 may suffer large transmission delays. Variations in telecommunications connection may be the result of telecommunication disruptions within the Internet 80 or telecommunications complex 90 or gaming system loads provided on virtual reality system 70. The enjoyment derived by a player from the present multi-player game may be significantly reduced when, for example, a player is waiting for a response from the game server to continue playing a game. The player may move its avatar, initiate dialogue, and substantiate other avatar actions, but if the world server complex 10 does not respond within an appropriate period of time and no indication of a problem is provided to the player, the perceived quality of the game software can suffer. Therefore, the multi-player game of the present invention provides for such a connection status indicator within the monitor window of the game console to indicate to the player the status of the connection to the game server including various statistics related to that connection.

Figure 7A:
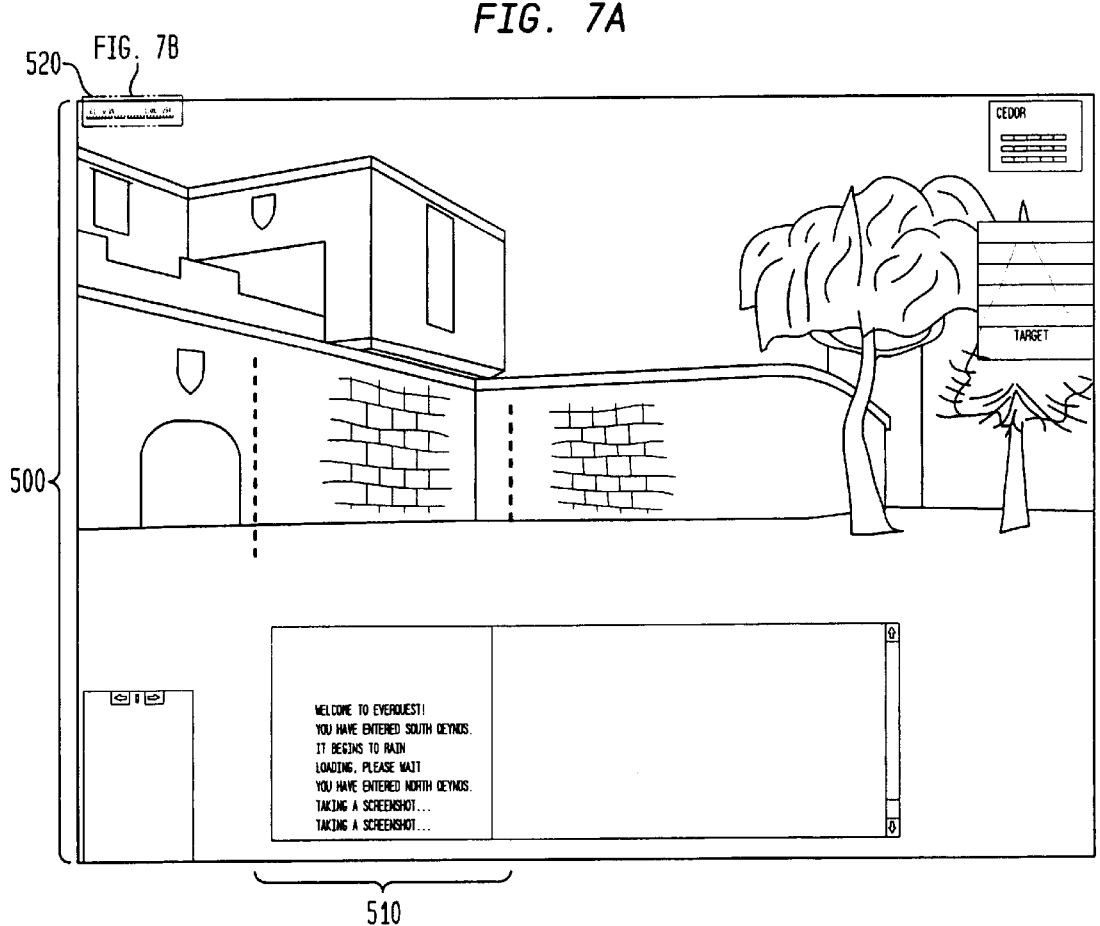
FIG. 7A is a monitor screen display illustrating a preferred embodiment of a visual display for providing network connection information.

FIG. 7A provides a monitor screen display 500 of a particular scene within the multi-user game environment according to one embodiment of the present invention. In particular, the screen display 500 includes a dialogue area 510 in which the user types and reads dialog that is to be spoken by the player's avatar and for providing the responses and dialog of all other avatars and NPCs within earshot of the player's avatar. Dialog area 510 may also provide non-speech indication of events occurring within the avatar's environment.

Figure 7B:
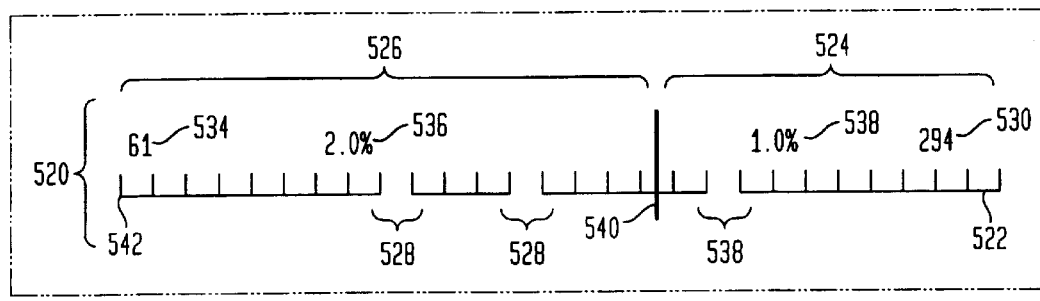
FIG. 7B is an enlarged view of the visual display shown in FIG. 7A.

Screen display 500 also includes other related game indicators, numerical information and graphics, as described above and in Appendix A. For example, network connection status area 520, shown at the top of FIG. 7A, and shown enlarged in FIG. 7B, is provided to display information related to the status of the connection established between the player's computer 81 and the world server complex 10. Network connection status area 520 includes packet transmission bar 522 which comprises two segments: (1) an outbound packet status bar 524, and (2) an inbound packet status bar 526. Packet transmission 520 bar may be filled in as a solid color (not appreciated from the black and white rendering), but portions of the bar may include missing, uncolored or otherwise designated portions 528 as further described below.

Numerous network related statistics are displayed above packet transmission bar 522. In the particular embodiment of FIG. 7B, the bandwidth of the network connection 530 is provided in bytes per second. The information for this statistic may be provided, for example, by the bandwidth tracking object 304 of FIG. 3. In addition, the average round trip transit time in milliseconds is displayed at 534 for packets sent from the virgin outbound queue 306 which have been acknowledged. Transmission packet losses, for example as a percentage of the last N packets received or sent, is provided for at 536 and 538 respectively. The information for these statistics may be provided, for example, by the timeout tracking object 302 of FIG. 3.

In operation, network connection status area 520 is divide into two segments: (1) the outbound packet status area disposed to the right of the display center mark 540, and (2) the inbound packet status area disposed to the left of the display center mark 540. Certain graphical information is also represented along status bar 520. As packets are received by a player's computer 81, the initially uncolored incoming packet status bar 526 is filled in as packets are received. So long as no interruptions in the last N packets are detected by the RDP transmission protocol described above, the incoming packet status bar remains solid. However, when a network interruption occurs, for example in the form of packets that are not received in sequence, empty regions 528 are created in the otherwise solid incoming packet status bar 536.

The packets received by computer 81 begins at the center mark 540 and slide to the left as additional packets are received. For example, as additional packets are received following an unsuccessful packet transmission attempt, empty region 528 slides from the center mark 540 to the outer edge of 542 of incoming status bar 526. Thus, the location of the missing packets within the last N received packets is represented with respect to the actual positions of the properly and improperly received packets.

Similarly, the right side of network connection status area 520 from center mark 540 provides a graphical indication of the outbound packet transmission from a player's computer 81 to the world server complex 10. Packet loss indictor 538 provides a numerical indication of the outbound packets for which acknowledges were not received, as represented by missing area 538. The outbound packet status bar 524 will slide from center mark 540 to the right as additional packets are transmitted.

It should be recognized that numerous other network related statistics may also be provided in network status display area 520 while keeping with the nature and scope of the present invention. For example, the size of the data packets being transmitted, the instantaneous size of the virgin outbound queue 306 and/or the outstanding queue 308. An indication of a catastrophic network failure or game server complex failure may also be presented in the status display this area 520.

Level of Detail ("LOD") Transmission and Display

The improved LOD features of the present invention is a significant feature that adds to the quality and enjoyment in playing a virtual reality game, which uses such improved LOD features. In the multi-player game system shown in FIG. 1, each update to an RPC's position requires messages to be sent from the computers 81–83 to the world server complex 10 indicating the change in the avatar's position. Further, complementary messages from the world server complex 10 to the players' computers 81–83 are sent to provide updated information regarding the resulting change in change in the avatar's perception of the virtual reality world.

In the context of a multi-player virtual reality environment, each player's connection is subject to a bandwidth "budget" restriction with respect to the world server complex 10. This connection bandwidth budget enables a large number of players to be efficiently and simultaneously accommodated for, so as to thereby provide each player with an enjoyable presentation of the virtual reality gaming experience.

Further, some players may use a modem to dial into the Internet to connect to the game server. These players may be limited in connection bandwidth for certain information updating functions. The present invention accounts for this situation. In a preferred embodiment, a message bandwidth of about 1500 characters per second is allocated for each player connection.

The refresh rate of the information is used below to refer to the number of times per second that the world server complex 10 sends an update message to a player's computer 81 to update the player's environment. This refresh rate should be chosen so as to provide a visual display that is pleasing to the player and which enables effective game playing. These refresh rates are typically between once each half-second and once every ten seconds. However, the refresh rate can vary widely and thus, is not a limiting factor on the scope of the present invention.

A preferred method for providing changes in the LOD is based on the balancing of several criteria as described below. In sum, information messages regarding the LOD of avatar's and the environment are prioritized to be transmitted in one of several tiers. In one preferred embodiment, four tiers (i.e., Tiers I, II, III and IV) are established with respective refresh message rates. Such tiers may vary widely, and may be respectively one-half second, 1 second, 3 seconds and 5 seconds. In Tier I bandwidth requirements, the level of detail of the information being sent is intended to be perceived by the user every refresh frame of the display monitor. Therefore, avatar updates messages sent every half-second are sufficient to provide a pleasing scene refresh rate using graphical interpolation techniques provided by the software on a player's computer 81, or through the Internet 80, to update the display between monitor frame refresh periods.

Figure 8:
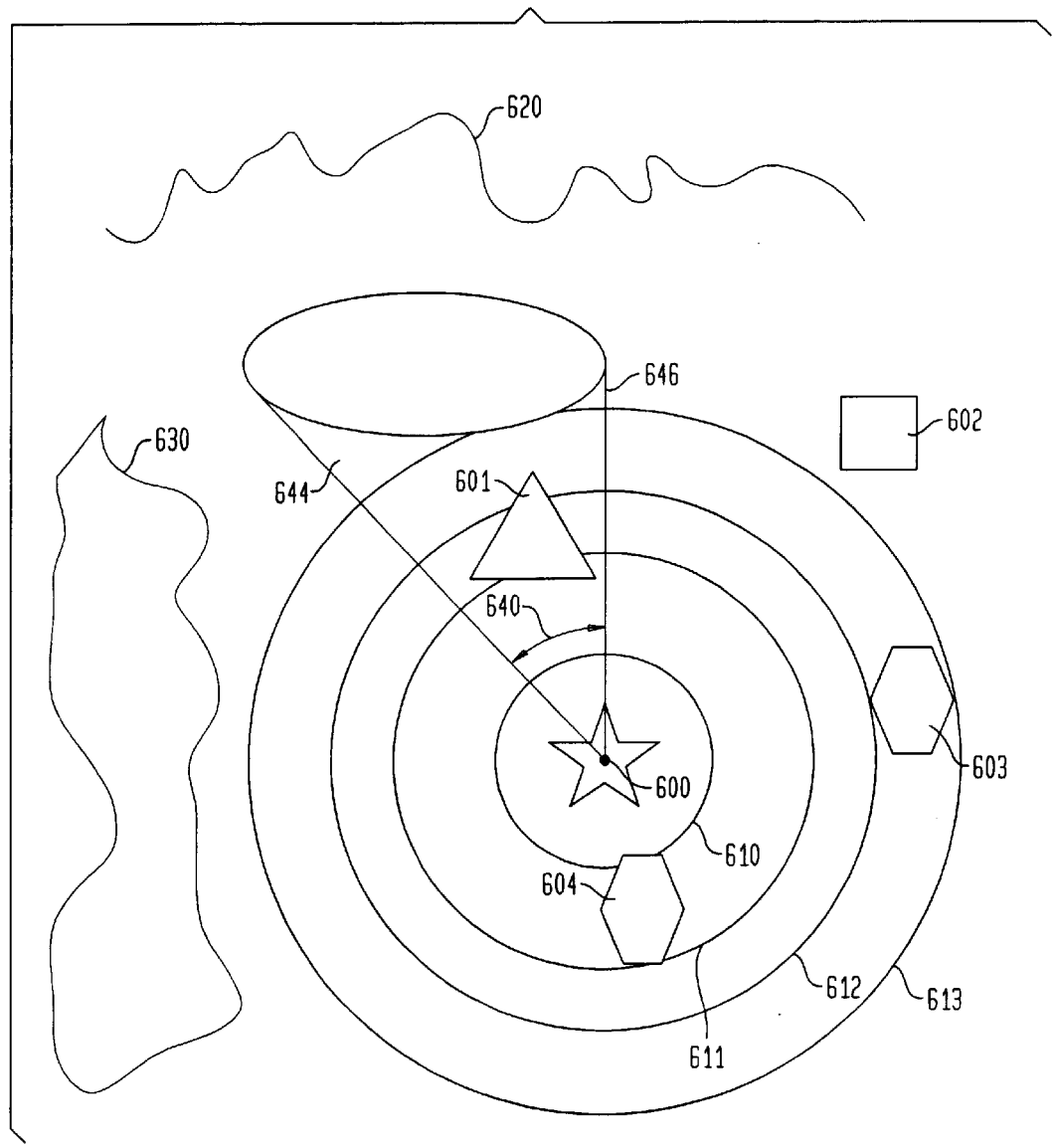
FIG. 8 is a schematic review of one example of a technique programmed within the multi-user virtual reality system software to render a particular level of detail according to one embodiment of the present invention.

FIG. 8 shows an avatar proximity diagram for the purpose of illustrating a method of rendering an efficient LOD to the game player according to one embodiment of the present invention. In particular, a first player's avatar 600 (shown as a star) will be situated at a point of reference 600 within the virtual reality environment. Other players' avatars 601 (shown as a triangle), 602 (shown as a square) and 603 (shown as a hexagon) are located at varying distances from the first player's avatar. Concentric proximity circles 610, 611, 612 and 613 indicate ranges of uniform distance from avatar point of reference 600. For example, proximity circle 610 may represent a distance of five feet from avatar 600 while proximity circles 611, 612 and 613 represent increasing distances of ten feet, fifteen feet, and twenty feet, respectively, from avatar 600.

The LOD needed to present avatar 600 with the geographical details in the background of the scene is very low. Such geographical details may include mountains 620, lake 630 and other such scene-based details. As the player's avatar 600 gets closer to these objects, however, the LOD presented by the central world server 15 and area servers 22, 24, 26 is desirably increased. In this regard, another player's avatar 602 standing at a distance outside the twenty foot radius circle 613 would include details regarding the outline of the avatar, some basic coloration of the avatar's clothing and adornments but may preclude rendering of detail regarding the avatar's finer features such as eyes and smaller adornments to the clothing.

When avatar 602 moves within the environment outside the circle 613, the refresh rate of the changed information as transmitted from the world server complex 10 to a player's computer 81 will be minimal. Such refreshing may take place once every two to five seconds, for example, without altering the game play functionality for avatar 600. For example, if avatar 602 picks up an item from the ground, the avatar 600 may be sent updating messages allowing it to perceive the actual motion of the avatar 602 bending down to pick up the item, but may not be capable of perceiving the actual item. Similarly, other players' avatars 603 and 601, located within proximity circles 613 and 612 respectively, would provide increasing LODs with respect to the graphical description of the avatar by transmitting messages related to their movement at a higher frequency refresh rate.

In a combat situation, where an avatar is within the five foot proximity circle 610, the central world server 15 and area servers 22–26 may send refresh messages on the order of every half second so as to provide a realistic LOD regarding the fast-paced combat for perception by the player operating avatar 600.

Another technique that may be used to limit the channel message bandwidth to those messages that have the greatest perceptual impact is a concept called view frustum culling. In view frustum culling, a player's avatar is provided with a frustum of vision 644 measured by volume 646 that constitutes the primary perception volume of the avatar. In practical terms, the view frustum may be considered the virtual character's (i.e., the avatar's) field of view. As with the use of proximity in determining the message refresh rate, the elements and avatars within the view frustum 644 are updated with the greatest frequency.

In the example of FIG. 8, the avatar at location 600 will be updated with messages regarding avatar 601 first and with a greater refresh rate than that for the avatar represented by 604 despite the closer proximity of avatar 604. In this manner, both the circles of proximity and view frustum culling are balanced by the central world server 15 and area servers 22–26 to determine the overall refresh rates for the entire surroundings of avatar 600.

Gradients of proximity to the view frustum may also used to determine an appropriate bandwidth tier for the avatars. For example, avatar 602, which is closer to the surface 646 of the view frustum, will be given a higher refresh priority than avatar 604, which is directly behind the avatar of interest. Thus, although avatar 604 may be within a closer proximity circle 611 than avatar 602 and would normally be updated with greater frequency (e.g., Tier II), avatar 604 is closer to the view frustum of avatar 600 and is consequently upgraded to a Tier I refresh rate. Likewise, the refresh rate for avatars outside the view frustum may be downgraded despite a proximity circle determination that normally provides the avatar with a higher refresh rate. A weighting module, programmed as part of the software implementing the virtual reality system, may be used to achieve an optimal allocation of importance to the two proximities for the purpose of conserving communication channel bandwidth.

In addition to the bandwidth tiers used to determine refresh rates, other data bit manipulations have been employed to reduce the bandwidth requirements of the messaging in the present invention. As mentioned above, each player connection is provided with a maximum messaging rate regardless of the number of changes and avatars within the proximity of the player's avatar. Thus, the maximum messaging rate must be balanced and divided among the elements contending for change messages. However, the data makeup of the messages themselves is also important to the overall player's perception of the game.

Figure 9:
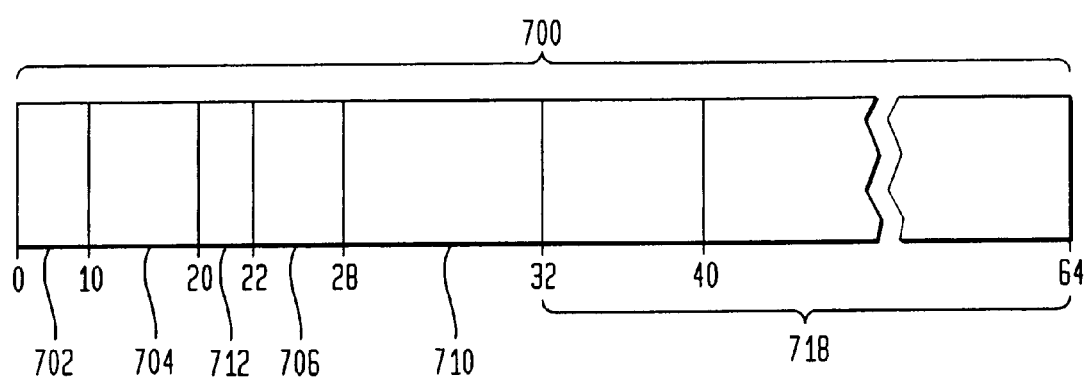
FIG. 9 is a schematic view of a message format according to one embodiment of the present invention.

FIG. 9 shows a typical message 700 comprising 64 bytes. Message 700 comprises a message header 702 and bit positions 704, 706, 710, 712 and 718 for encoding and conveying the necessary movement information. In a preferred embodiment of the present invention, bit stuffing may be used to allocate a variable number of bits for each category of avatar movement change. In this manner, those avatar change categories that provide a greater number of bits are provided a greater number of possibilities or degrees of freedom for effecting the change within each message. Thus, for example, the heading (i.e., direction travel for the avatar) may be determined to be more important than the pitch (i.e., the vertical head angle of the avatar's head). As such, the heading may be represented by ten bits 704 giving 1024 possible headings for the player avatar within message

700, while the pitch may be represented by only two bits 712 giving four possible vertical head positions. Other categories of character movement, such as velocity (represented by four bits) 710 or other degree of freedom are similarly represented by a fixed number of bits 706, 718 to which a range of that particular motion is attributed. As between the different categories, however, the number of bits ascribed to that characteristic relate directly to the degrees of freedom provided for that particular movement category and therefore to its overall importance in the game conduct.

An example of the consequences of this bit stuffing is now provided. Assume that a player directs an avatar to perform the following actions essentially simultaneously. The avatar starts off quickly in a direction different from the one in which he was originally facing. In addition, and using different controls on a computer 81, a player also changes the pitch of the avatar's head to look to the sky, say for the sake of avoiding falling arrows. If the entire range of pitch motion comprises greater than four positions, a realistic assumption for the purpose of rendering good visibility for the avatar and reducing "choppiness" in the visual rendering, then the above-mentioned bit prioritization may permit the increase in velocity and the change in avatar direction in a single message, but not the full range of pitch change. As such, additional messages will have to be sent to effect the full pitch change of the avatar.

In another preferred embodiment of the invention, a dynamic bit stuffing technique is employed in which the number of bits ascribed to each category of movement may be made variable as between messages so as to provide more degrees of freedom within any given category for any given message. For example, if the avatar in the example above does not change its velocity or heading but only alters its pitch and only two bits are used to represent pitch changes for each message, an undue number of messages may be required to effect the change in the avatar thus increasing the needed messaging bandwidth.

Message queuing is also used according to another embodiment of the present invention. Since the lower level transport protocols (e.g., the RDP mentioned above) have transmission overheads associated with the sending of each message across the communications channel, it is efficient to queue the application messages until a "critical mass" of messages can be sent simultaneously. In this manner, the bandwidth and message transmission overhead for each transmitted message are reduced and the communications overhead is decreased.

Finally, the server and player's game software use a movement continuity management function to determine an avatar's movement between transmitted update messages. For example, if the last known heading and velocity of an avatar are provided and follow-up messages providing changes to that information are not immediately received, the world server and game software continue to advance the avatar as if the last recorded changes would have been maintained, including interpolating any rates of change, until a message either confirming the change or providing a contrary change is received. In the latter case, the world server complex 10 and the player's computer software are programmed in a like fashion so that as much correlation as possible is maintained by the interpolation performed by the two systems. In the former case (i.e., when the movement changes and rates of change are actually intended to be maintained), an added benefit with respect to bandwidth reduction is realized in that additional messages confirming those changes are not required.

In conjunction with the above-mentioned interpolation between messaging, it is significant to maintain a common point of reference throughout the multi-player game universe as among the players' computers 81–83 and world server complexes. Only one "true" holder of the overall system and game status may be used to properly and efficiently administer the large scale multi-player game of the present invention. In this regard, the world server complex 10 is always considered to be "true" in that only it possesses the correct information with respect to the virtual reality world. As an example, if a player's avatar moves from location one to location two but the message indicating that move never reaches the world server complex 10, then the world servers and the remaining player's computers will consider the move to never have taken place and the avatar's position will be considered to be the last one held by the world server complex 10.

Patching Tool

Given the large number of players using the present multi-player game and the difficulties in downloading software updates for use on those players' computers 81–83 which interact with the game, a software update mechanism for the multi-player games will ensure that all players are operating with the same software. In this regard, a patch, which refers to a piece of software that is used to update the running software on a computer, is provided to each user who logs into play the system prior to playing the system itself. The frequency at which this can take place may vary, although in an ideal situation the patches would all take place upon each player's login so that each player is using the most current version of the software representing the game in operation at that time.

Further complicating software patch for updating a user's software environment, the different worlds in world server 15 within the EverQuest™ gaming system may require different patches based on the world in which that player intends to operate. This is also true for the EverQuest™ test world 7 in which data testing and patches are used to update a player's system. As such, a patch system which updates a player's software must first determine whether a player wishes to play in any particular world, and then must update the appropriate software while that player is online selecting a particular world.

Unlike other software distribution mechanisms transferring files between user systems, for example File Transfer Protocol ("FTP"), the EverQuest™ system preferably uses HTTP as a basis for the file update function. The files transferred by HTTP include a binary file transport with a cyclical redundancy check ("CRC") performed on the file at the receiving end. The files also transferred from central world server 15 to a player's computer 81 are then implemented as part of the player's software application.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A computer system for implementing a virtual reality game used by a plurality of users, said computer system comprising:

a telecommunications complex;

a plurality of world server complexes;

a plurality of user computers connected to said world server complexes through said telecommunications complex;

an administration server connected to said plurality of world server complexes and said plurality of user computers through said telecommunications complex; and a visual display created on at least one display screen for providing statistics about said computer system, said visual display comprising a world status area identifying a plurality of virtual reality worlds and including information about (a) the number of users logged into one or more said plurality of virtual worlds who have submitted petitions related to their respective worlds and (b) the number of participating administrative guides logged into each of the worlds to enable dispatching of the administrative guides to the world to assist in responding to the petitions.

2. The computer system of claim 1 wherein said world status area further comprises information about the number of users who have submitted questions about said virtual reality game.

3. The computer system of claim 1 wherein said plurality of users of said virtual reality game are assigned at least one status level based on their achievements within said virtual reality game, said world status area further identifying the number of users at said status levels logged into said plurality of virtual worlds.

4. The computer system of claim 1 further comprising a computer system status area identifying information about the number of users utilizing said computer system.

5. The computer system of claim 4 wherein said computer status area includes a telecommunications status area identifying the number of packets of data sent and received by said telecommunications complex.

6. The computer system of claim 4 wherein said computer system status area further includes a router status area identifying the overall flow of packets of information through said administration server.

7. The computer system of claim 6 wherein said router status area further identifies the elapsed time since the last user of said plurality of users logged into said computer system.

8. The computer system of claim 6 further comprising a plurality of routers arranged within said telecommunications complex, wherein said router status area further identifies the average quantity of data for each user handled by routers of said telecommunications complex.

9. The computer system of claim 1 wherein each of said plurality of world server complexes comprises at least one world server and a plurality of area servers, said at least one world server being responsible for administering a virtual reality world, said plurality of area servers being responsible for administering unique virtual geographic areas within respective ones of said virtual reality worlds, said world status area of said visual display identifying information about the number of user computers logged into said virtual geographic areas within respective ones of said virtual worlds.

10. The computer system of claim 1, wherein the petitions are visually highlighted to indicate severity of the petitions.

11. The computer system of claim 10, wherein the severity indicated is based on the number of outstanding petitions.

12. The computer system of claim 10, wherein the severity indicated is based on nature of the outstanding petitions.

13. The computer system of claim 1, wherein said administrative guides comprise one or more of game masters, senior guides, regular guides and apprentice guides.

14. A method of creating a visual display on at least one display screen relating to a multi-user virtual reality game, said method comprising:

utilizing a plurality of world server complexes to create unique virtual reality worlds in which a user can interact with other users through avatars, operated by user computers connected to said world server complexes;

utilizing an administration server connected to said plurality of world server complexes and said plurality of user computers through a telecommunications network;

providing a visual display on at least one display screen, said visual display including a world status area which identifies a plurality of virtual worlds and information about (a) the number of users logged into said plurality of virtual worlds who have submitted petitions related to their respective worlds and (b) the number of participating administrative guides logged into each of the worlds to enable dispatching of the administrative guides to the world to assist in responding to the petitions.

15. The method of claim 14 wherein said method comprises displaying information about the number of users who have submitted questions about the virtual reality game within said world status area.

16. The method of claim 14 wherein users of said virtual reality game are assigned at least one status level based on their achievements within said virtual reality game, said method comprises displaying information within said world status area about the quantity of users at particular status levels logged into said plurality of virtual worlds.

17. The method of claim 14 further comprising displaying a computer system status area within said visual display on said at least one display screen, said computer system status area identifying information about the number of users utilizing said computer system.

18. The method of claim 14 further comprising displaying a telecommunications status area within said computer system status area, wherein said telecommunications status area includes information about the number of packets of data being sent and received by a telecommunications complex of said computer system.

19. The method of claim 18 further comprising arranging a router status area as part of said computer system status area, said router status area identifying information about the overall flow of packets of data through said administration server.

20. The method of claim 19 wherein said router status area further identifies information about the elapsed time since the last user of said plurality of users logged into said computer system.

21. The method of claim 20 wherein said router status area further identifies the average quantity of data for each user handled by routers of said telecommunications network.

22. The method of claim 14, wherein the petitions are visually highlighted to indicate severity of the petitions.

23. The method of claim 22, wherein the severity indicated is based on the number of outstanding petitions.

24. The method of claim 22, wherein the severity indicated is based on nature of the outstanding petitions.

25. The method of claim 14, wherein said administrative guides comprise one or more of game masters, senior guides, regular guides and apprentice guides.

26. A visual display created on a display screen for providing statistics related to a computer system for implementing a virtual reality game used by a plurality of users, said computer system including a telecommunications network and a plurality of world server complexes connected to an administration server for providing said visual display, said visual display comprising:

a computer system status area for providing information regarding a status of said computer system including the number of said users using said computer system; and a world status area for providing information regarding said users using said world server complexes including (a) the number of said users using each of said world server complexes who have submitted petitions related to their respective worlds and (b) the number of participating administrative guides logged into each of the worlds to enable dispatching of the administrative guides to the world to assist in responding to the petitions.

27. The visual display of claim 26 wherein said computer system status area further includes a telecommunications status area displaying information about the number of packets of data being sent and received through said telecommunications network.

28. The visual display of claim 26 wherein said world status area further includes a virtual reality game management area having interactive buttons to obtain information about selected virtual reality worlds to be displayed in said world status area.

29. The visual display of claim 26, wherein the petitions are visually highlighted to indicate severity of the petitions.

30. The visual display of claim 29, wherein the severity indicated is based on the number of outstanding petitions.

31. The visual display of claim 29, wherein the severity indicated is based on nature of the outstanding petitions.

32. The visual display of claim 26, wherein said administrative guides comprise one or more of game masters, senior guides, regular guides and apprentice guides.

33. A computer system for implementing a virtual reality game used by a plurality of users, said computer system comprising:

a telecommunications complex;

a plurality of world server complexes;

a plurality of user computers connected to said world server complexes through said telecommunications complex;

an administration server connected to said plurality of world server complexes and said plurality of user computers through said telecommunications complex; and a visual display created on at least one display screen for providing statistics about said computer system, said visual display comprising a world status area identifying a plurality of virtual reality worlds and including information about (a) the number of users logged into one or more said plurality of virtual worlds at a given achievable character status level within each of their respective worlds and (b) the number and level of participating administrative guides logged into each of the worlds.

34. The computer system of claim 33, wherein said administrative guides comprise one or more of game masters, senior guides, regular guides and apprentice guides.

35. The visual display of claim 33, wherein said administrative guides comprise one or more of game masters, senior guides, regular guides and apprentice guides.

36. A method of creating a visual display on at least one display screen relating to a multi-user virtual reality game, said method comprising:

utilizing a plurality of world server complexes to create unique virtual reality worlds in which a user can interact with other users through avatars, operated by user computers connected to said world server complexes;

utilizing an administration server connected to said plurality of world server complexes and said plurality of user computers through a telecommunications network;

providing a visual display on at least one display screen, said visual display including a world status area which identifies a plurality of virtual worlds and information about (a) the number of users logged into one or more said plurality of virtual worlds at a given achievable character status level within each of their respective worlds and (b) the number and level of participating administrative guides logged into each of the worlds.

37. The method of claim 36, wherein said administrative guides comprise one or more of game masters, senior guides, regular guides and apprentice guides.

38. A visual display created on a display screen for providing statistics related to a computer system for implementing a virtual reality game used by a plurality of users, said computer system including a telecommunications network and a plurality of world server complexes connected to an administration server for providing said visual display, said visual display comprising:

a computer system status area for providing information regarding a status of said computer system including the number of said users using said computer system; and a world status area for providing information regarding said users using said world server complexes including (a) the number of users logged into one or more said plurality of virtual worlds at a given achievable character status level within each of their respective worlds and (b) the number and level of participating administrative guides logged into each of the worlds.

\* \* \* \* \*